(12) United States Patent
Zhang et al.

(10) Patent No.: US 12,095,512 B1
(45) Date of Patent: Sep. 17, 2024

(54) BANDWIDTH ALLOCATION METHOD AND ASSOCIATED OPTICAL LINE TERMINAL

(71) Applicant: CABLE TELEVISION LABORATORIES, INC., Louisville, CO (US)

(72) Inventors: Haipeng Zhang, Broomfield, CO (US); Junwen Zhang, Shanghai (CN); Jingjie Zhu, Erie, CO (US); Mu Xu, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/211,482

(22) Filed: Jun. 19, 2023

Related U.S. Application Data

(63) Continuation of application No. 17/503,278, filed on Oct. 16, 2021, now Pat. No. 11,683,102.

(60) Provisional application No. 63/092,744, filed on Oct. 16, 2020.

(51) Int. Cl.
*H04B 10/69* (2013.01)
*H04B 10/516* (2013.01)

(52) U.S. Cl.
CPC ..... *H04B 10/6932* (2013.01); *H04B 10/5161* (2013.01)

(58) Field of Classification Search
CPC .............. H04B 10/5161; H04B 10/6932
USPC ....................................................... 398/202
See application file for complete search history.

(56) References Cited

U.S. PATENT DOCUMENTS

| | | | |
|---|---|---|---|
| 8,897,644 B2 | 11/2014 | Sugawa et al. | |
| 8,938,167 B2 | 1/2015 | Yoo et al. | |
| 9,925,424 B2 | 3/2018 | Ladd et al. | |
| 11,683,102 B1 * | 6/2023 | Zhang ................ | H04B 10/6932 398/202 |

(Continued)

FOREIGN PATENT DOCUMENTS

| | | | | |
|---|---|---|---|---|
| KR | 100493071 B1 * | 6/2005 | | |
| WO | WO-2006106499 A2 * | 10/2006 | ......... | H04L 12/5695 |

OTHER PUBLICATIONS

Liu et al; adaptive dynamic wavelength and bandwidth allocation algorithm based on error-back-propagation neural network prediction; Dec. 2018; Journal of Optics Communications; pp. 1-9. (Year: 2018).*

(Continued)

*Primary Examiner* — Amritbir K Sandhu
(74) *Attorney, Agent, or Firm* — Cozen O'Connor

(57) ABSTRACT

A method for allocating bandwidth to a first ONU, a second ONU, $M_1$ ONUs, and $M_2$ ONUs includes, during an allocation cycle, (i) granting a respective upstream time slot to, of a plurality of N ONUs, only each of the $M_1$ ONUs, and (ii) granting a first upstream time slot to the first ONU. Each of the $M_1$ ONUs and $M_2$ ONUs is one of the plurality of N ONUs. The method also includes, during a subsequent cycle, (i) granting a respective upstream time slot to, of the plurality of N ONUs, only each of the $M_2$ ONUs. The N ONUs includes a skipped-ONU that is one of either, and not both, the $M_1$ ONUs and the $M_2$ ONUs. The method includes, during the subsequent allocation cycle, granting a second upstream time slot to a second ONU, which is not one of the plurality of N ONUs.

20 Claims, 6 Drawing Sheets

(56) References Cited

U.S. PATENT DOCUMENTS

| | | |
|---|---|---|
| 2007/0041384 A1 | 2/2007 | Das et al. |
| 2010/0254707 A1 | 10/2010 | Peng et al. |
| 2011/0085785 A1 | 4/2011 | Ishii |
| 2011/0129223 A1* | 6/2011 | Yoo .................... H04Q 11/0067 398/58 |
| 2011/0217041 A1* | 9/2011 | Yoshida ............. H04Q 11/0067 398/58 |
| 2011/0255866 A1 | 10/2011 | Veen et al. |
| 2012/0315045 A1 | 12/2012 | Spector |
| 2018/0332373 A1 | 11/2018 | Wey et al. |
| 2021/0160597 A1 | 5/2021 | Doo et al. |

OTHER PUBLICATIONS

Is Liu et al; adaptive dynamic wavelength and bandwidth allocation algorithm based on error-back-propagation neural network prediction; Dec. 2018; Journal of Optics Communications; pp. 1-9. (Year: 2018).*

Nejm et al; Dynamic Reallocation of SLA Parameters in Passive Optical Network Based on Clustering Analysis; 2018; Orange Labs; pp. 1-8. (Year: 2018).

* cited by examiner

BANDWIDTH ALLOCATION METHOD AND ASSOCIATED OPTICAL LINE TERMINAL

CROSS-REFERENCE TO RELATED APPLICATIONS

This application is a continuation of U.S. patent application Ser. No. 17/503,278, filed 16 Oct. 2021 and entitled "Bandwidth Allocation method and Associated Optical Line Terminal", which benefits from and claims priority to U.S. provisional patent application Ser. No. 63/092,744, filed on Oct. 16, 2020. The disclosure of each of the aforementioned applications is incorporated herein by reference in its entirety.

BACKGROUND

Delivering more reliable bandwidth with lower network latency has been a top focus in optical access networks. In this context, new emerging services such as 5G mobile X-haul, edge computing, AR/VR Gaming, Tactile Internet and UHD video distribution, are placing these additional bandwidth and latency demands on access networks. This implies that low latency and high reliability will be increasingly important for future access networks, which are expected to deliver more latency demanding services. For instance, a 1-10 millisecond End-to-End (e2e) latency is required for the 3GPP F1 mobile fronthaul interface, while this number reduces to only several hundreds of microseconds (<1 ms) if we move to a lower layer function-split of mobile fronthaul.

As a point-to-multi-point system, the Passive Optical Network (PON) has been one of the dominant architectures to provide bandwidth sharing among different types of services. In general, dynamic bandwidth allocation (DBA) is used in PON to allocate upstream bandwidth based on the instantaneous demands and requests from the users and the network traffic congestion condition. Each user is associated with a respective optical network unit (ONU). DBA schemes generally determine the upstream bandwidth sharing efficiency and the latency performance. Different DBA algorithms or strategies have been proposed to support upstream bandwidth sharing, however, most of which are only designed to support a small number of users. For instance, typical PON DBA is designed to manage bandwidth sharing for thirty-two users per PON port in EPON or GPON. An optical line terminal (OLT) polls from all of the users to gather their bandwidth requests and then allocates bandwidth to them. If the number of users becomes greater than 64, such as 128, 256 or even 512, the current DBA scheme will introduce a large amount of latency overhead to all users of a network that employs (Time Division Multiple Access) TDMA.

SUMMARY OF THE EMBODIMENTS

Reducing the guard interval (GI) overhead is important for increasing efficiency of PONs, for example, when such a reduction may enable a PON to support a larger number of users. Coherent PON is one of such technologies that have superior receiver sensitivity and large capacity capable of supporting up to 512 users on a single wavelength using time-division multiplexing (TDM). Therefore, a generic DBA architecture and control process that can support large split ratios (e.g.: 1:128, 1:256 and 1:512) and can be flexible enough to support different numbers of users from small to large (from 32 to 512 for example) is desired. FIG. 1 shows example flexible CPON deployment architectures 101, 102, and 103. In each architecture 101-103, an OLT 100 transmits data to and receives data from respective pluralities of ONUs 191, 192, and 193. Architecture 102 includes 32 ONUs 192(1-32). Architecture 103 includes 128 ONUs 190(1-128).

With a large power budget, CPON supports a large number of user connections with a short fiber transmission distance in areas with a high user density, such as urban area as shown in architecture 101. It also has the ability to provide services to users away from OLT 100, with a small split ratio. For instance, as shown in architecture 102, 32 users are supported with 80-km fiber transmission. Moreover, a hybrid scenario is a more common use case, as shown in architecture 103, with a large dynamic combination of distance and split ratios. Therefore, we need a DBA scheme with multiple modes that should be flexible enough to support different deployment scenarios and should be able support larger service-level agreement differences to support future low-latency services with flexible quality of service (Qos).

Even while 100G CPON reduces the transmission time by a factor of ten compared with 10G EPON, the GI between different uplink bursts is not negligible, as the GIs introduce more bandwidth overhead when the number of users becomes larger. This is because, even when there is no upstream bandwidth requested by an ONU, the ONU still transmits at least one codeword plus one GI in a polling cycle to remain active on requesting future potential bandwidth.

In architectures 101-103, ONUs 191-193 transmit data to OLT 100 via an uplink data stream. The data stream is divided into a plurality of temporal frames, the duration of which is the duration of a polling cycle. Each temporal frame includes one or more time slots. A polling cycle may include a time-slot allocation cycle, during which OLT 100 grants each time slot to an ONU.

FIG. 2 is a schematic of two temporal frames 210 and 220 of respective data streams sent to OLT 100 from a plurality of ONUs. Temporal frame 210 includes time slots 212(1-32), and may correspond to a temporal frame of architecture 102, such that each time slot 212 is allocated to a respective ONU 192(1-32). Temporal frame 210 includes a respective of guard interval 213 after each of the thirty-two time slots 212. Temporal frame 220 includes time slots 222(1-128), and may correspond to a temporal frame of architecture 103, such that each time slot 222 is allocated to a respective ONU 193(1-128). Temporal frame 220 includes a respective of guard interval 223 after each of the 128 time slots 222.

Herein, usable bandwidth is the total duration of a temporal frame allocated to time slots, rather than guard intervals. Keeping the duration of the temporal fame constant while increasing the number of time slots within the temporal frame decreases the frame's usable bandwidth. For example, when the duration of temporal frames 210 and 220 are both $T_F$ and the length of the guard interval is $T_{GI}$, the usable bandwidths of frames 210 and 220 are $(T_F-32T_{GI})$ and $(T_F-128T_{GI})$ respectively.

While increasing the duration of temporal frame 220 to accommodate more ONUs increases the fraction of usable bandwidth of temporal frame 220, such an increase also increases the duration of each polling cycle, and hence increases latency. When a large number of users share the same bandwidth resource, it becomes more difficult to assure service quality for low-latency applications, as the overall latency is significantly increased by the increased polling cycle.

Herein we disclose a generic and flexible DBA architecture and polling scheme that meet the requirements for different number of endpoints for a point-to-multipoint network topology. Embodiments of the disclosed DBA architecture are based on user aggregation and grouping to support the number of users on a single PON to vary from small to large (e.g., 32 to 512) with overhead reduction. For example, whereas the number of time slots 212 per temporal frame 210 equals the number of ONUs 192 (thirty-two in this example), a temporal frame of embodiments disclosed herein includes fewer than thirty-two time slots 212. Hence, in a first polling cycle (e.g., a time-slot allocation cycle thereof), such that some ONUs 192 are not allocated a time slot 212 ("skipped ONUs), which enables OLT 100 to grant the remaining ONUs 192 longer time lots while also increasing usable bandwidth by reducing the number of guard intervals 213. In a subsequent polling cycle, at least one of the skipped ONUs 192 may be allocated a time slot, while at least one ONU 192 previously allocated a time slot in the first polling cycle may be skipped.

In embodiments, the scheme groups the users based on different latency requirements while maintaining the compatibility with multipoint control protocol (MPCP) in legacy PON standards. Embodiments of this DBA scheme support larger service-level agreement (SLA) differences to support future low-latency services with more flexible quality of service (Qos).

In a first aspect, a method for allocating bandwidth to a first ONU, a second ONU, $M_1$ ONUs of a plurality of N ONUs of an optical network, and $M_2$ ONUs of the plurality of N ONUs is disclosed. The method includes, during a first time-slot allocation cycle, (i) granting a respective upstream time slot of a first plurality of upstream time slots to, of the plurality of N ONUs, only each of the $M_1$ ONUs, and (ii) granting a first upstream time slot to the first ONU. The method also includes during a second time-slot allocation cycle that follows the first time-slot allocation cycle, (i) granting a respective upstream time slot of a second plurality of upstream time slots to, of the plurality of N ONUs, only each of the $M_2$ ONUs, the plurality of N ONUs including a skipped-ONU that is one of either, and not both, the $M_1$ ONUs and the $M_2$ ONUs; and (ii) granting a second upstream time slot to a second ONU, which is not one of the plurality of N ONUs. The first ONU, the second ONU, and each of the plurality of N ONUs may be communicatively coupled to an optical line terminal (OLT) of the optical network.

In a second aspect, a bandwidth allocation method includes, during a first time-slot allocation cycle, granting a respective upstream time slot of a first plurality of upstream time slots to $M_1$ ONUs, and to no other ONUs, of a plurality of ONUs, N in number. The method also includes, during the first time-slot allocation cycle, granting a first upstream time slot to a first ONU, which is not one of the plurality of ONUs. The method also includes, during a second time-slot allocation cycle that follows the first time-slot allocation cycle, granting a respective upstream time slot of a second plurality of upstream time slots to $M_2$ ONUs, and to no other ONUs, of the plurality of ONUs. Each of $M_1$ and $M_2$ is a positive integer less than N. The plurality of ONUs includes a skipped-ONU that is one of either, and not both, the $M_1$ ONUs and the $M_2$ ONUs. The method also includes, during the second time-slot allocation cycle, granting a second upstream time slot to a second ONU, which is not one of the plurality of ONUs. The first ONU, the second ONU, and each of the plurality of ONUs are communicatively coupled to an optical line terminal of an optical network.

In a second aspect, an optical line terminal includes a processor and a memory communicatively coupled thereto. The memory storing non-transitory computer-readable instructions that, when executed by the processor, cause the processor to execute the bandwidth allocation method of either one of the first aspect and the second aspect.

DETAILED DESCRIPTION OF THE EMBODIMENTS

Figure 1:
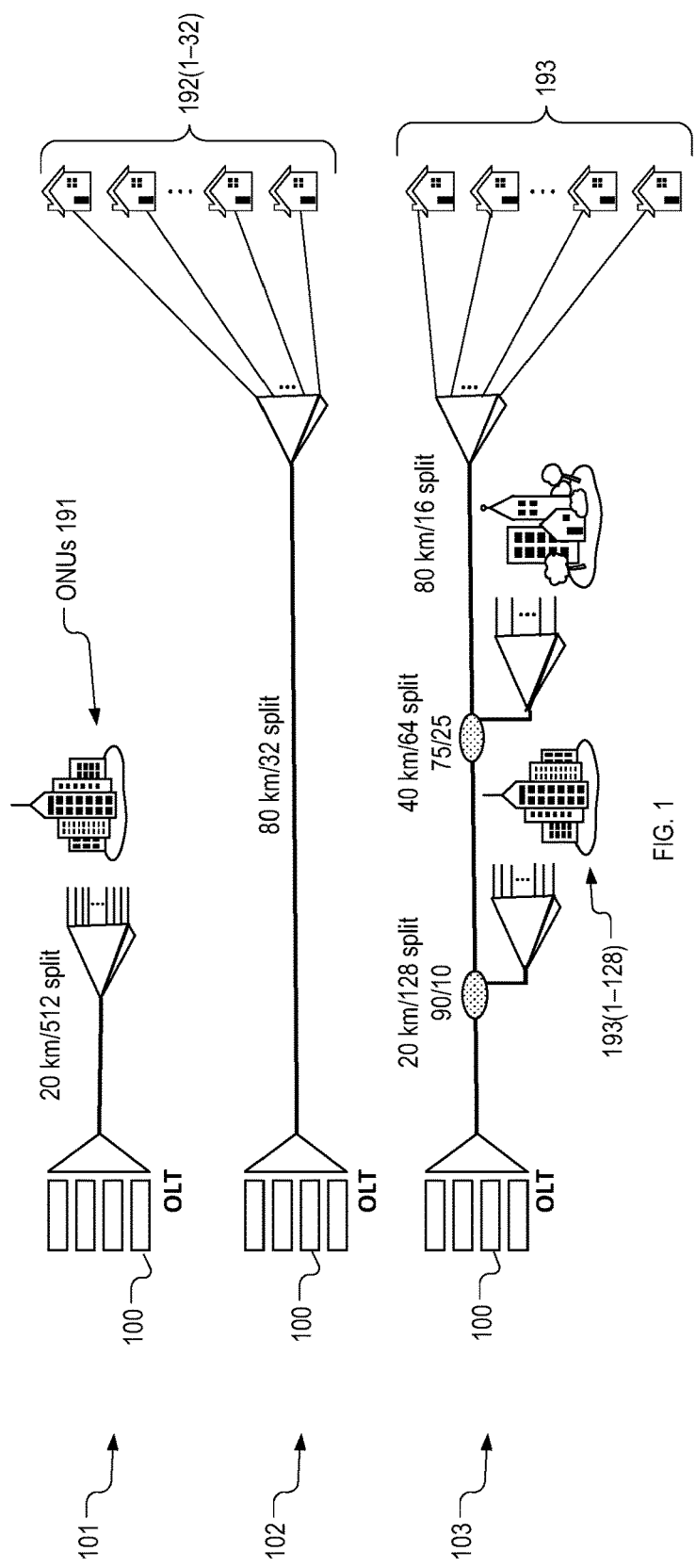
FIG. 1 is a schematic of flexible deployment architectures, of a CPON, in which optical network units (ONUs) transmit data to an optical line terminal (OLT).
Figure 2:
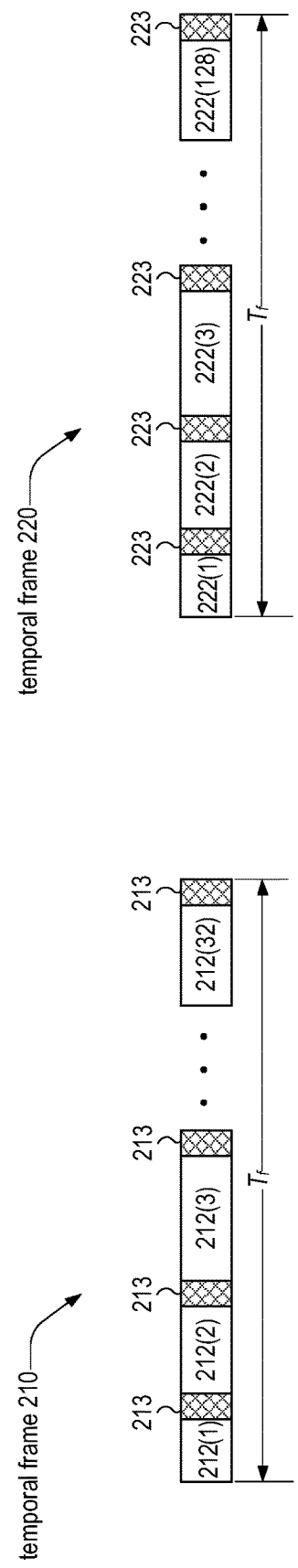
FIG. 2 is a schematic of two temporal frames of respective uplink data streams sent from ONUs of FIG. 1 to an OLT of FIG. 1, in embodiments.
Figure 3:
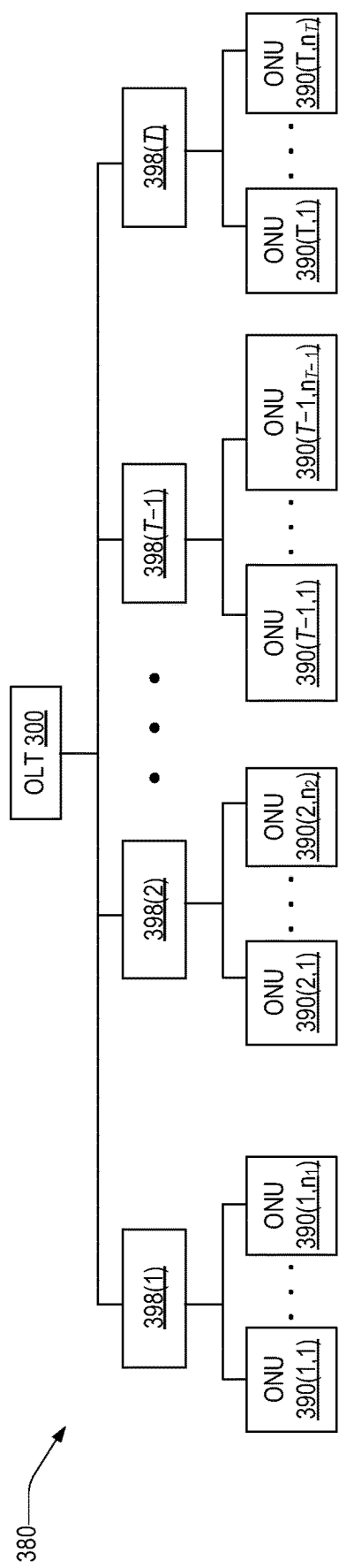
FIGS. 3-5 are respective schematics of an optical network that includes an optical line terminal that implements hierarchic aggregation and grouping for dynamic bandwidth allocation, in embodiments.

FIG. 3 is a schematic of an optical network 380, which includes an optical line terminal (OLT) 300 and a plurality of ONUs 390. Each ONU 390 is illustrated as being part of one, and only one, of a respective ONU group 398(1, 2, ..., T), where T is a positive integer. For example, each of ONUs 390(1,1), 390(1,2), ... 390(1,$n_1$) is part of ONU group 398(1).

To increase usable bandwidth during each polling cycle of optical network 380 via user aggregation and grouping, we first generate the top-level virtual ONU groups 398 that represent groups of users (of ONUs 390) in the second level as the delegate. Each aggregated virtual ONU group 398(g) incudes $n_g$ ONUs 390, where g in a positive integer less than or equal to T. In a two-level architecture, the ONUs 390 are actual subscriber ONUs or end users. If more levels are used, the bottom layer may be the actual subscriber ONUs 390. Each aggregated virtual ONU group 398 may contain at least one actual subscriber ONU 390. When performing round-robin polling, the OLT 300 first polls each top-level aggregated virtual ONU group 398. OLT 300 then decides which ONUs 390 (the actual subscriber ONUs) within each virtual aggregated ONU group 398 receives the bandwidth allocation, and which ONUs 390 skip the current polling cycle. While using this arrangement, the proposed PON DBA remains compatible with MPCP of current Ethernet PON standards in the data link layer.

A round-robin allocation may be implemented for top-level polling, which in this case is inter-group polling of each ONU group 398). Alternatively or additionally, other DBA algorithms, such as Interleaved Polling with Adaptive Cycle Time (IPACT), may be applied. In embodiments, actual subscribers are grouped dynamically in the proposed scheme to enable flexible and dynamic QoS.

For second-level polling, namely intra-group polling of each ONU 390, there may be different methods or criteria for different use case scenarios. A first method includes fair granting within each virtual round-robin polling. In this method, each ONU 390 has an equal opportunity to be granted bandwidth for upstream data transmission and piggyback bandwidth request. A second method provides dynamic transmission opportunity based on bandwidth demand (request), in which the priorities of an ONU 390 are based on its bandwidth demands. In other words, ONUs 390 with large bandwidth requests have high priorities. A third method provides dynamic transmission opportunity based on traffic types, or QoS or latency-requirements. In this method, the priorities of an ONUs 390 are based on its traffic types, or QoS agreements, or latency requirements.

The priority of ONUs 390 may be distinguished by following the above intra-group polling arrangement. For example, when each ONU group 398 is allocated an equal number of time slots of a temporal frame during a time-slot allocation cycle, each high-priority ONU 390 may be part of an ONU group 398 with relatively few members, which increase the probability that the high-priority ONU 398 will be allocated bandwidth for the time-slot allocation cycle.

The grouping and also the priority in each group are both dynamic, which means the users (ONUs 390) may be grouped as needed (e.g., between consecutive time-slot allocation cycles) based on their service level agreements, their QoS priority, their bandwidth demands, their bandwidth consumption behaviors, their network traffic types, and also their latency requirements, and any new registrations of ONU 390. OLT 300 has full capability to manage and control the grouping, inter and intra group bandwidth allocations.

Figure 4:
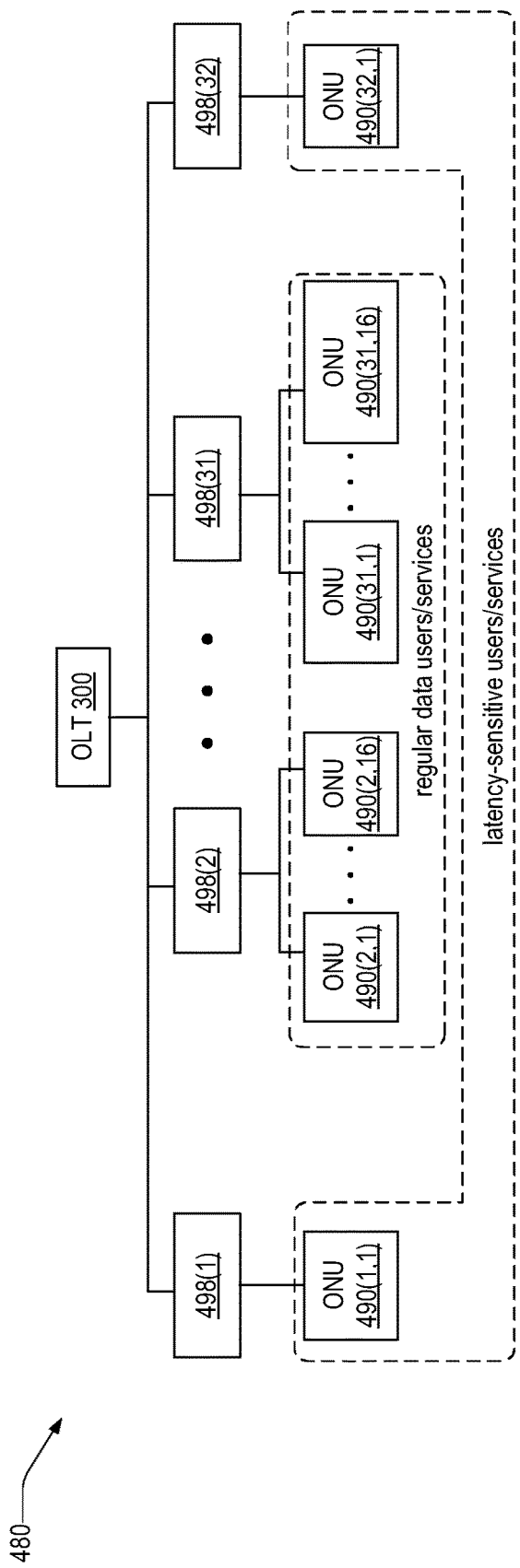

FIG. 4 is a schematic of an optical network 480, which is an example of optical network 380 where T=32. Network 480 has a hybrid grouping architecture to support hybrid deployment scenario. ONU 490 and ONU group 498 are respective examples of ONU 390 and ONU 398.

FIG. 4 denotes ONUs 490(1,1) and 490(32,1) as being associated with latency-sensitive users or services, which demand high priority. As such, ONU 490(1,1) is the only ONU of virtual ONU group 498(1), and ONU 490(32,1) is the only ONU of virtual ONU group 489(32). By this arrangement, ONU 490(1,1) and 498(32, 1) have more chance to be polled. For example, when OLT 300 allocates each ONU group 498 at least one time slot during a polling cycle, each of ONUs 490(1,1) and 490(32,1) is allocated a time slot. Hence, the respective polling cycles of ONUs 490(1,1) and 490(32,1) (the time between being allocated consecutive time slots) are at most the total transmission time of 32 users plus 32 guard intervals. In other words, these high-priority ONUs 490 may achieve ultra-low and reliable latency performance.

The proposed method may also be applied to future high-speed PONs such as the 100G coherent PON. By implementing the proposed idea, the number of GI per polling cycle is reduced, which also reduces the transmission time 100G Coherent PON. Therefore, allowing ONUs 490 to accumulate more traffic in the queues does not affect the average latency by much (comparing to introducing more GIs). Extending the polling cycles for certain ONUs 490 by using the aggregated DBA framework provides overall latency improvements and bandwidth savings because of reduced number of guard intervals per time unit.

Figure 5:
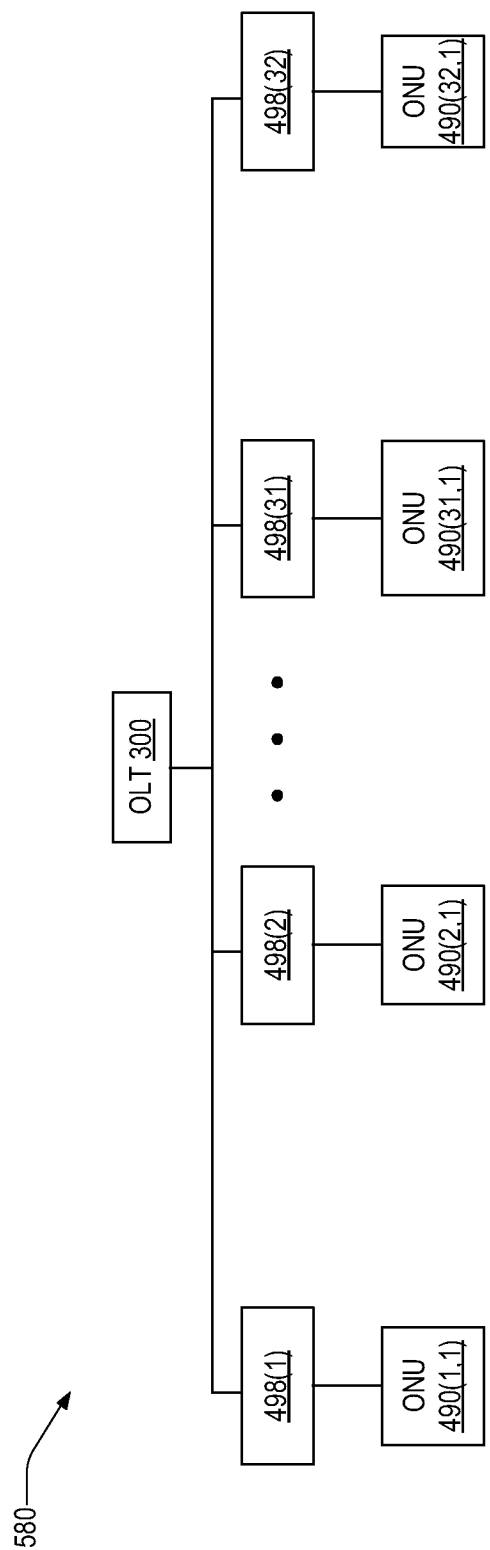

As mentioned above, the proposed method is flexible and generic, which may support different numbers of users from large to small (e.g., from 512, to 32 and even fewer). FIG. 5 is a schematic of an optical network 580, which is an example of optical network 380 where T=32 and the total number of ONUs 490 is also 32. In this use case, there are thirty-two aggregated virtual ONU groups 498 that are managed by OLT 300. Since the number of actual subscribers 490 is also thirty-two, each virtual ONU group 498 includes only one child ONU 490. The example of optical network 580 demonstrates the proposed scheme's flexibility of supporting any number of users within the power budget range. When there are less than 32 actual subscriber ONUs 490 in the service group, the number of virtual ONU groups 498 may be adjusted accordingly.

Implementations

The proposed improvements may be enabled and supported by modifying the current operation of standards/specifications, including but not limited to the following examples:

In the current IEEE 802.3ca NG-EPON 144.3.4 the Logical link identifier (LLID) types are defined as (a) Physical Layer ID (PLID), (b) Management link ID (MLID), (c) User link ID (ULID), and (d) Group link ID (GLID). To support the large number of ONUs in DBA by using the proposed idea, the existing LLID may be used to enable the proposed method or make small modifications to the PLID (adding bits) to allow more information to be contained.

A first method directly uses PLID to manage the aggregated virtual ONU group, while in each group, ULID may be used to specify different child ONUs. One child ONU may have more than one ULIDs, which may be grouped by the GLID. Therefore, different actual-subscriber ONUs may be mapped to one PLID but different ULIDs.

In a second method, more bits (one or more) are added to the PLID domain to indicate the level of ONUs. Each actual subscriber ONU has a specific PLID, and the PLID indicates the aggregated virtual ONU group to which the actual subscriber ONUs belong. The functions of MLID, ULID, GLID are the same compared with legacy NG-EPON.

A third method, which differs from each of first and second methods, uses the existing LLID without introducing new LLID types. New LLID types may be introduced and defined. For example, five different logical link identifier (LLID) types may be defined: (1) Aggregation group ID (AGID), (2) Physical Layer ID (PLID), (3) Management link ID (MLID), (4) User link ID (ULID), and (5) Group link ID (GLID). In such an arrangement, each real subscriber ONU will have one AGID, one PLID, one MLID, at least one ULID and GLID. Comparing with the traditional NG-EPON, the discovery and registration process are the same. After registration, the ONU will be assigned LLIDs according to the above method and registered in the OLT.

Figure 6:
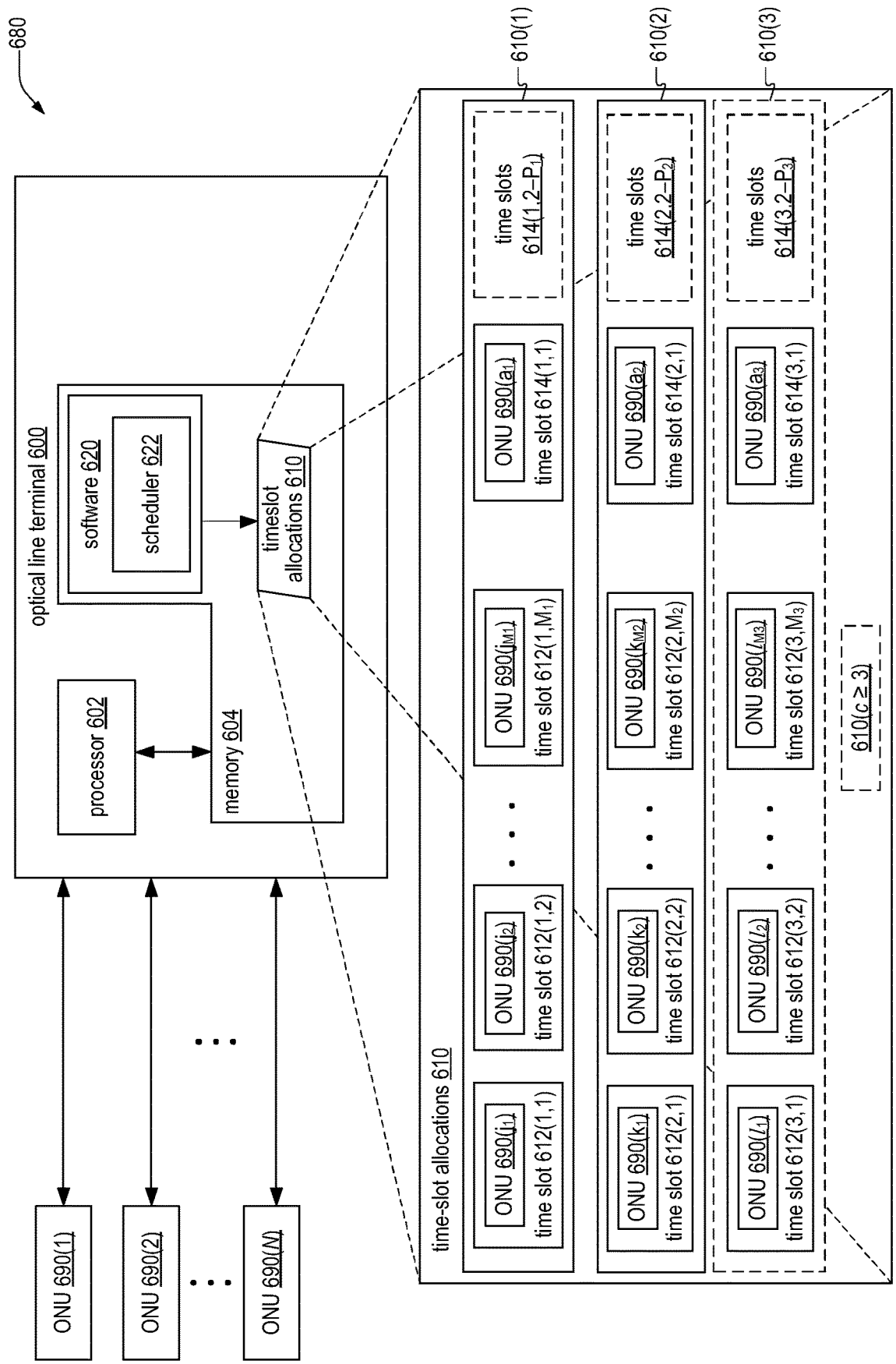
FIG. 6 is a schematic of an optical line terminal within an optical network, in an embodiment.

FIG. 6 is a schematic of an optical line terminal 600, hereinafter OLT 600. OLT 300 is an example of OLT 600. OLT 600 includes a processor 602 and a memory 604. Memory 604 stores non-transitory computer-readable instructions as software 620. When executed by processor 602, software 620 causes processor 602 to implement the functionality of OLT 600 as described herein. Software 620 may be, or include firmware, and in embodiments includes a scheduler 622. FIG. 6 shows OLT 600 as part of an optical network 680 that includes a number N ONUs 690(1–N). OLT 600 is communicatively coupled to each ONU 690. Examples of ONU 690 include ONU 390 and ONU 490.

Memory 604 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 604 may be integrated into processor 602.

In communication networks that employ time-division multiplexing methods, such as TDMA, data from multiple ONUs is repeatedly multiplexed within a series of temporal frames, each of which includes a plurality of time slots. A data stream received by OLT 600 includes a sequence of such frames. Part of the functionality of OLT 600 is, for each frame, to grant each time slot to an ONU 690.

Memory 604 stores at least one time-slot allocations 610, such as time-slot allocations 610(1) and 610(2). Time-slot allocations 610(1) and 610(2) may be associated with respective time-slot allocation cycles that are consecutive or non-consecutive. Memory 604 may store multiple time-slot allocations 610 simultaneously, or store only a single time-slot allocation 610 at any given time. Each time-slot allocation 610 maps each of a plurality of time slots of a time-slot allocation cycle to one of ONUs 690. These time slots include time slots 612 and a time slot 614.

Time-slot allocation 610(1) includes a quantity $M_1$ time slots $612(1,1-M_1)$ and a time slot $614(1,1)$ of a first time-slot allocation cycle. Time-slot allocation 610(2) includes a quantity $M_2$ time slots $612(2,1-M_2)$ and a time slot $614(2,1)$ of a second time-slot allocation cycle. Each of $M_1$ and $M_2$ is a positive integer less than N. In embodiments, at least one of $M_{1=1}$ and $M_2=1$.

In embodiments, memory 604 also stores time-slot allocations 610(3). Time-slot allocation 610(3) includes a quantity $M_3$ time slots $612(1,1-M_3)$ and a time slot $614(1,1)$ of an additional time-slot allocation cycle. $M_3$ is a positive integer less than N, and may be equal to one. Time-slot allocations 610(2) and 610(3) may be associated with respective time-slot allocation cycles that are consecutive or non-consecutive.

FIG. 6 illustrates each time slot 612 and 614 with a respective ONU 690 inside of it, which denotes that OLT 600 has granted the time slot to the ONU. In time-slot allocation 610(1), time slots $612(1,1-M_1)$ are granted to ONUs $690(j_1, j_2, \ldots, j_{M_1})$ respectively, and time slot $614(1,1)$ is granted to ONU $690(1)$. Each of indices $j_1, j_2, \ldots, j_{M_1}$ and index $a_1$ is a positive integer less than or equal to N. None of indices $j_1, j_2, \ldots, j_{M_1}$ is equal to index $a_1$. An example of ONUs $690(j_1, j_2, \ldots, j_{M_1})$ is any one of $M_1$ ONUs 390 of a same ONU group $398(a_1)$, FIG. 3. An example of ONU $690(a_1)$ is any single ONU 390 of a second ONU group $398(a_2)$, where each of indices $a_1$ and $a_2$ are positive integers less than or equal to T, and $a_1 \neq a_2$.

In time-slot allocation 610(2), time slots $612(1,1-M_2)$ are granted to ONUs $690(k_1, k_2, \ldots, k_{M_2})$ respectively, and time slot $614(2,1)$ is granted to ONU $690(a_2)$, where each of indices $k_1, k_2, \ldots, k_{M_2}$ and index $a_2$ is a positive integer less than or equal to N. None of indices $k_1, k_2, \ldots, k_{M_2}$ is equal to index $a_2$. ONUs 690 includes a once-skipped ONU $690(s1)$, which is one of either, but not both of, ONUs $690(j_1, j_2, \ldots, j_{M_1})$ or ONUs $690(k_1, k_2, \ldots, k_{M_2})$. An example of $690(k_1, k_2, \ldots, k_{M_2})$ is any one of $M_2$ ONUs 390 of a same ONU group 398(1), FIG. 3. An example of ONU $690(a_2)$ is any single ONU 390 of a second ONU group 398(2), where each of indices $\beta_1$ and $\beta_2$ are positive integers less than or equal to T, and $\beta_1 \neq \beta_2$.

Herein, allocation cycles are indexed by an index c, where c=1 and c=2 in time-slot allocations 610(1) and 610(2), respectively. Time-slot allocations 610 may include additional time-slot allocations 610(c≥3). In each time-slot allocation 610(c), the total number of time slots in allocations cycles may be $(M_c+1)$, which is also less than N.

In embodiments, each time-slot allocation 610 includes no time slots other than time slots 612 and 614, such that the total number of time slots in time-slot allocations 610(1) and 610(2) are, respectively, $(M_1+1)$ and $(M_2+1)$. In embodiments, each of $(M_1+1)$ and $(M_2+1)$ is less than N, such that in each of time-slot allocation 610(1,2), at least one ONU 690 is not granted a time slot.

In embodiments, at least one time-slot allocation 610 includes more than one time slot 614, denoted as time slots $614(c, 2-P_c)$. $P_c$ is an integer greater than or equal to two and represents the total number of time slots 614. In embodiments, each time-slot allocation 610 includes no time slots other than time slots 612 and 614, such that the total number of time slots in time-slot allocations 610(1) and 610(2) are, respectively, $(M_1+P_1)$ and $(M_2+P_2)$. In embodiments, each of $(M_1+P_1)$ and $(M_2+P_2)$ is less than N, such that in each time-slot allocation 610(1,2), at least one ONU 690 is not granted a time slot. When time-slot allocation 610 includes just one time slot 614, e.g., examples of ONU $690(a_1)$ and $690(a_2)$ include ONU 490(1,1) and 490(32,1) of FIG. 4.

Not granting each of ONUs 690 a time slot during a time-slot allocation 610 has a technical benefit of reducing the number of guard intervals of the temporal frame and time slots associated with the time-slot allocation. This reduction of guard intervals increases the efficiency of each allocation cycle by reducing the amount of time during of a temporal frame of a data stream not associated with data transmission.

Figure 7:
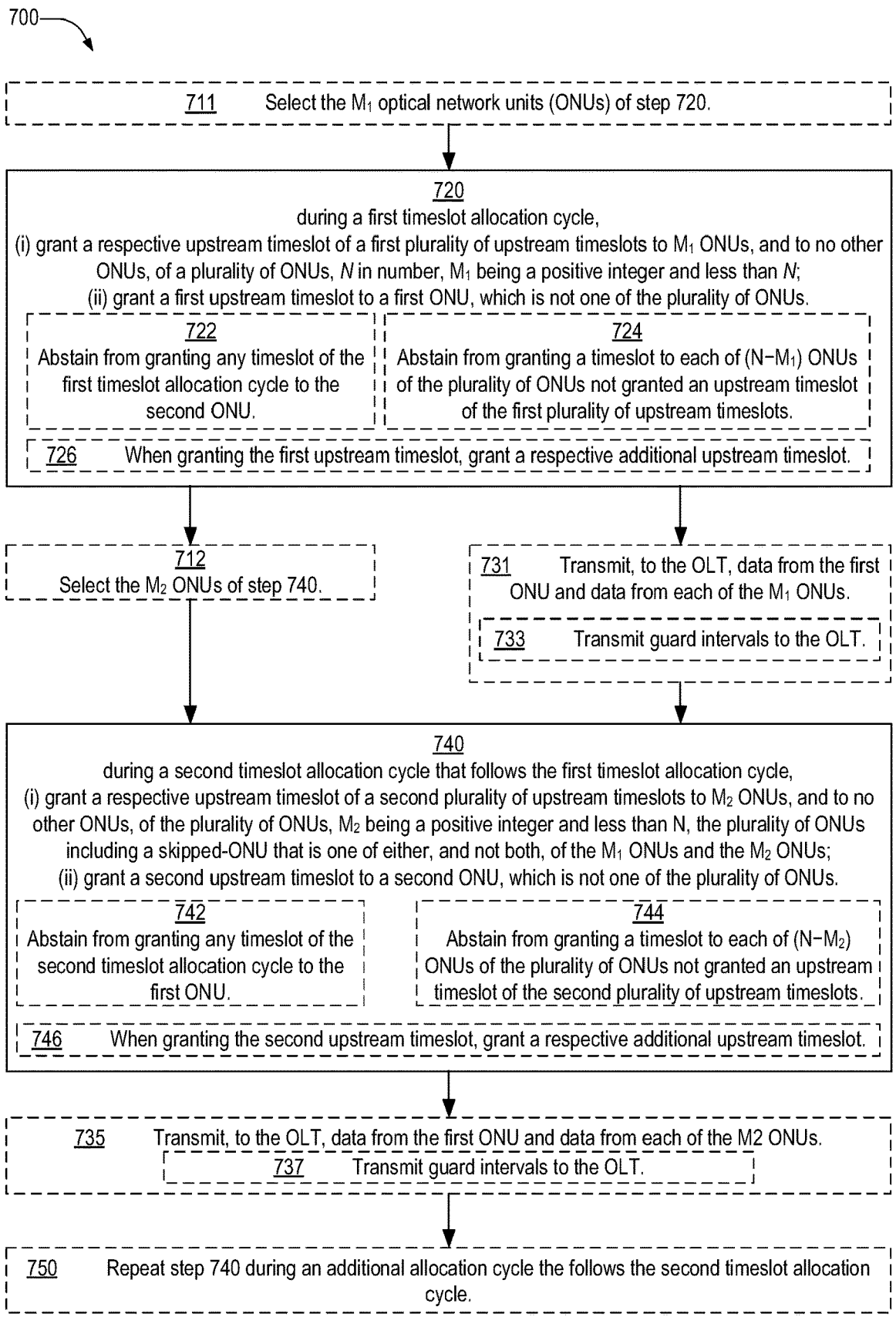
FIG. 7 is a flowchart illustrating a first bandwidth allocation method, in an embodiment.

FIG. 7 is a flowchart illustrating a bandwidth allocation method 700. In embodiments, method 700 is implemented within one or more aspects of OLT 600 operating as part of optical network 680. In embodiments, method 700 is implemented by processor 202 executing computer-readable instructions of software 620, for example, of scheduler 622. Method 700 includes steps 720 and 740. In embodiments, method 700 also includes at least one of steps 711, 712, 731, 735, and 750.

Step 720 includes, during a first time-slot allocation cycle, granting a respective upstream time slot of a first plurality of upstream time slots to $M_1$ ONUs, and to no other ONUs, of a plurality of ONUs, N in number. $M_1$ is a positive integer less than N. Step 720 also includes, during the first time-slot allocation cycle, granting a first upstream time slot to a first ONU, which is not one of the plurality of ONUs. The first plurality of upstream time slots does not include the first upstream time slot. In embodiments, the first ONU and each of the plurality of ONUs are communicatively coupled to an optical line terminal of an optical network. Herein, the additional plurality of ONUs, N in number, as also referred to as a plurality of N ONUs.

In an example of step 720, OLT 600 grants each time slot $612(1,1-M_1)$ to a respective ONU $690(j_1, j_2, \ldots, j_{M_1})$, and to no other ONUs 690. In this example, OLT 600 also grants time slot $614(1,1)$ to ONU $690(a_1)$.

Step 711 occurs before step 720 and includes selecting the $M_1$ ONUs either probabilistically or according to at least one of (a) a queue depth, (b) traffic type, (c) a quality of service agreement, and (d) latency requirement, of each of the plurality of ONUs. In an example of step 711, OLT 600 selects the $M_1$ ONUs 690 granted a time slot in step 720 according to information, received from ONUs 690, pertaining to at least one of criteria (a)-(d) of step 711.

Step 731 includes, after the first time-slot allocation cycle and before the second time-slot allocation cycle, (i) transmitting data from the first ONU to the OLT, and (ii) transmitting data from each of the $M_1$ ONUs to the OLT. In an example of step 731, ONU $690(a_1)$ and each of ONUs $690(j_1, j_2, \ldots, j_{M_1})$ transmit data to OLT 600. In embodiments, step 731 includes step 733, which includes transmitting, by each of the $M_1$ ONUs, a respective guard interval to the OLT such that, during the first time-slot allocation cycle, a total number of guard intervals associated with data transmitted by the plurality of ONUs is less than N. In an example of step 733, ONU 690($a_1$) and each of ONUs 690($j_1, j_2, \ldots, j_{M_2}$) transmit a respective guard interval to OLT 600.

Step 740 includes, during a second time-slot allocation cycle that follows the first time-slot allocation cycle, granting a respective upstream time slot of a second plurality of upstream time slots to $M_2$ ONUs, and to no other ONUs, of the plurality of ONUs. $M_2$ is a positive integer less than N. The plurality of ONUs includes a skipped-ONU that is either (i) one of the $M_1$ ONUs, or (ii) one of the $M_2$ ONUs exclusively, such that the skipped-ONU is not one of both the $M_1$ ONUs and the $M_2$ ONUs. Step 740 also includes, during the second time-slot allocation cycle, granting a second upstream time slot to a second ONU, which is not one of the plurality of ONUs. The second plurality of upstream time slots does not include the second upstream time slot. In embodiments, the second ONU is communicatively coupled to the optical line terminal.

In an example of step 740, OLT 600 grants each time slot 612(2,1-$M_2$) to a respective ONU 690($k_1, k_2, \ldots, k_{M_2}$), and to no other ONUs 690. In this example, OLT 600 also grants time slot 614(2,1) to ONU 690($a_2$). In embodiments, the first ONU and the second ONU are the same ONU such that, in the preceding examples of steps 720 and 740, $a_1=a_2$.

In embodiments, step 720 includes at least one of steps 722 and 724. Step 722 includes, during the first time-slot allocation cycle, abstaining from granting any time slot of the first time-slot allocation cycle to the second ONU. In an example of step 722, ONU 690 abstains from granting any time slots, e.g., any of time slots 612 and 614, to ONU 690($a_2$). Step 724 includes, during the first time-slot allocation cycle, abstaining from granting a time slot to each of (N-$M_1$) ONUs of the plurality of ONUs not granted an upstream time slot of the first plurality of upstream time slots. In an example of step 724, ONU 690 abstains from granting any time slots to ONUs 690 that are not one of ONUs 690($j_1, j_2, \ldots, j_{M_1}$).

In embodiments, step 720 includes step 726. Step 726 is applicable when each of the first ONU and the second ONU is one of an additional plurality of ONUs, Q in number, communicatively coupled to the OLT. The additional plurality of ONUs and the plurality of ONUs may be mutually exclusive, such that no ONU is part of both the plurality of ONUs and the additional plurality of ONUs. The first and second time-slot allocation cycles include a first and a second plurality of additional upstream time slots respectively. In FIG. 3, ONU groups 398(1) and 398(2) are respective examples of the plurality of ONUs and the additional plurality of ONUs. Herein, the additional plurality of ONUs, Q in number, as also referred to as a plurality of Q ONUs.

Step 726 includes, when granting the first upstream time slot (in step 720), granting a respective additional upstream time slot, of the first plurality of additional upstream time slots, to ($P_1$-1) ONUs, and to no other ONUs, of the additional plurality of ONUs. The quantity Q exceeds $P_1$, and $P_1$ is a positive integer. In a first example of step 726, OLT 600 grants each of time slots 614(1, 2-$P_1$) to a quantity ($P_1$-1) ONUs 690 that are not one of ONUs 690($j_1, j_2, \ldots, j_{M_1}$). In a second example of step 726, OLT 600 grants each of time slots 614(1, 2-$P_1$) to a quantity ($P_1$-1) of ONUs of ONU group 398(2), none of which are part of ONU group 398(1). In embodiments, the ($P_1$-1) ONUs include the second ONU. For example, ONU 690($a_2$) may be one of the ($P_1$-1) ONUs 690 granted a time slot in step 726.

In embodiments, step 740 includes at least one of steps 742 and 744, which are analogous to steps 722 and 724, respectively, as applied to the second time-slot allocation cycle. Step 742 includes, during the second time-slot allocation cycle, abstaining from granting any time slot of the second time-slot allocation cycle to the first ONU. In an example of step 722, ONU 690 abstains from granting any time slots, e.g., any of time slots 612 and 614 to ONU 690($a_1$). Step 744 includes, during the second time-slot allocation cycle, abstaining from granting a time slot to each of (N-$M_2$) ONUs of the plurality of ONUs not granted an upstream time slot of the second plurality of upstream time slots. In an example of step 744, ONU 690 abstains from granting any time slots to ONUs 690 that are not one of ONUs 690($k_1, k_2, \ldots, k_{M_2}$).

In embodiments, step 740 includes step 746, which is analogous to step 726 as applied to the second time-slot allocation cycle. Step 746 includes, when granting the second upstream time slot (in step 740), granting a respective additional upstream time slot, of the second plurality of additional upstream time slots, to ($P_2$-1) ONUs, and to no other ONUs, of the additional plurality of ONUs. The quantity Q exceeds $P_2$, and $P_2$ is a positive integer. In a first example of step 746, OLT 600 grants each of time slots 614(2-$P_2$) to ($P_2$-1) of ONUs 690 that are not one of ONU 690($k_1, k_2, \ldots, k_{M_2}$). In a second example of step 746, OLT 600 grants each of time slots 614(2-$P_2$) to $P_1$ of ONUs of ONU group 398(2), none of which are part of ONU group 398(1). In embodiments, the ($P_2$-1) ONUs include the second ONU. For example, ONU 690($a_1$) may be one of the ($P_2$-1) ONUs 690 granted a time slot in step 746.

Step 712 occurs before step 740 and includes selecting the $M_2$ ONUs either probabilistically or according to at least one of (a) a queue depth, (b) traffic type, (c) a quality of service agreement, and (d) latency requirement, of each of the plurality of ONUs. In an example of step 712, OLT 600 selects the $M_2$ ONUs 690 granted a time slot in step 740 according to information, received from ONUs 690, pertaining to at least one of criteria (a)-(d) of step 712

Step 735 includes, after the first time-slot allocation cycle, (i) transmitting data from the first ONU to the OLT, and (ii) transmitting data from each of the $M_2$ ONUs to the OLT. In an example of step 735, ONU 690($a_2$) and each of ONUs 690($k_1, k_2, \ldots, k_{M_2}$) transmit data to OLT 600. In embodiments, step 731 includes step 737, which includes transmitting, by each of the $M_2$ ONUs, a respective guard interval to the OLT such that, during the second time-slot allocation cycle, a total number of guard intervals associated with data transmitted by the plurality of ONUs is less than N. In an example of step 737, ONU 690($a_2$) and each of ONUs 690($k_1, k_2, \ldots, k_{M_2}$) transmit a respective guard interval to OLT 600.

Step 750 is applicable when the plurality of ONUs includes a twice-skipped-ONU that is among neither of the $M_1$ ONUs and the $M_2$ ONUs granted a time slot in steps 720 and 740 respectively. In embodiments, the twice-skipped-ONU is also neither of the first ONU nor the second ONU that had been allocated time slots in steps 720 and 740 respectively. Step 750 includes, during an additional time-slot allocation cycle that follows the second time-slot allocation cycle, granting a respective upstream time slot of an additional plurality of upstream time slots to $M_3$ ONUs, and to no other ONUs, of the plurality of ONUs. $M_3$ is a positive integer less than N. The $M_3$ ONUs include the twiceskipped-ONU. In an example of step 750, time-slot allocations 610 includes time-slot allocation 610(3). In this example of step 750, OLT 600 grants each time slot 612(3, 1-$M_3$) to a respective ONU 690($l_1$, $l_2$, . . . , $l_{M_2}$), and to no other ONUs 690. In this example, OLT 600 also grants time slot 614(3,1) to ONU 690($a_3$). ONU 690($l_1$, $l_2$, . . . , $l_{M_2}$) includes at least one ONU 690 that is among neither of 690($j_1$, $j_2$, . . . , $j_{M_2}$) and 690($k_1$, $k_2$, . . . , $k_{M_2}$). Each of indices $l_1$, $l_2$, . . . , $l_{M_1}$ and index $a_3$ is a positive integer less than or equal to N.

Figure 8:
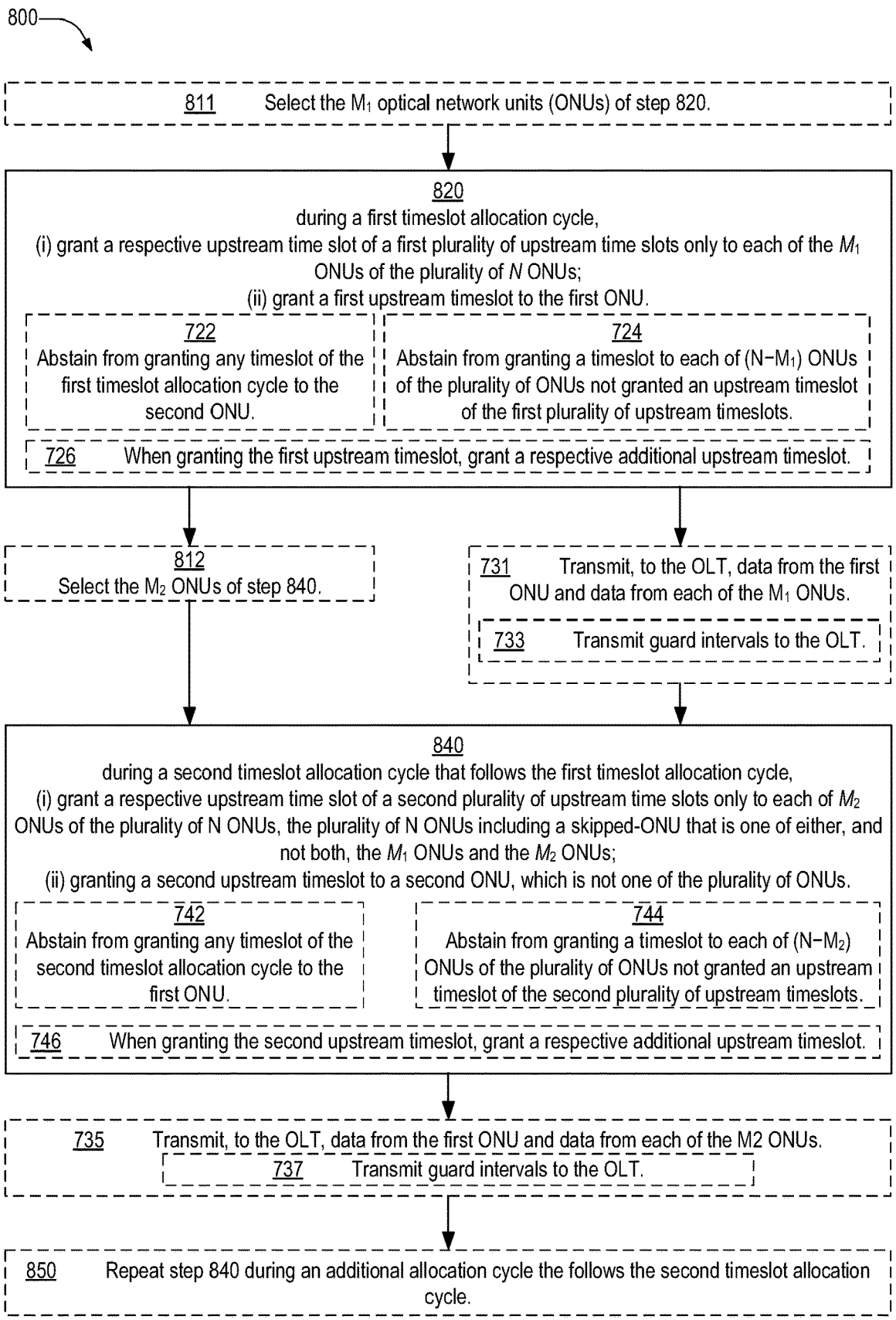
FIG. 8 is a flowchart illustrating a second bandwidth allocation method, in an embodiment.

FIG. 8 is a flowchart illustrating a bandwidth allocation method 800 for allocating bandwidth to a first ONU, a second ONU, $M_1$ ONUs, and $M_2$ ONUs of an optical network. Each of the $M_1$ ONUs and $M_2$ ONUs is one of a plurality of N ONUs of the optical network. In embodiments, the $M_1$ ONUs and $M_2$ ONUs are not mutually exclusive, such that one or more ONUs of the plurality of N ONUs may be one of the $M_1$ ONUs and one of the $M_2$ ONUs, and that the total number of distinct ONUs of the $M_1$ ONUs and $M_2$ ONUs is less than the sum of $M_1$ and $M_2$.

In embodiments, the first ONU, the second ONU, and each of the plurality of N ONUs are communicatively coupled to an optical line terminal of the optical network. Method 800 may be implemented within one or more aspects of OLT 600 operating as part of optical network 680. In embodiments, method 800 is implemented by processor 202 executing computer-readable instructions of software 620, for example, of scheduler 622. Method 800 includes steps 820 and 840. In embodiments, method 800 also includes at least one of steps 811, 812, 731, 735, and 850.

Step 820 includes, during a first time-slot allocation cycle, (i) granting a respective upstream time slot of a first plurality of upstream time slots to, of the plurality of N ONUs, only each of the $M_1$ ONUs, and (ii) granting a first upstream time slot to the first ONU. In an example of step 820, OLT 600 grants each time slot 612(1,1–$M_1$) to a respective ONU 690($j_1$, $j_2$, . . . , $j_{M_1}$), and to no other ONUs 690. In this example, OLT 600 also grants time slot 614(1,1) to ONU 690($a_1$). Step 820 may include at least one of steps 722, 724, and 726, each of which are introduced in method 700.

Step 840 includes during a second time-slot allocation cycle that follows the first time-slot allocation cycle, (i) granting a respective upstream time slot of a second plurality of upstream time slots to, of the plurality of N ONUs, only each of the $M_2$ ONUs, the plurality of N ONUs including a skipped-ONU that is one of either, and not both, the $M_1$ ONUs and the $M_2$ ONUs; and (ii) granting a second upstream time slot to a second ONU, which is not one of the plurality of N ONUs. In an example of step 840, OLT 600 grants each time slot 612(2,1–$M_2$) to a respective ONU 690($k_1$, $k_2$, . . . , $k_{M_2}$), and to no other ONUs 690. In this example, OLT 600 also grants time slot 614(2,1) to ONU 690($a_2$). In embodiments, the first ONU and the second ONU are the same ONU such that, in the preceding examples of steps 820 and 840, $a_1$=$a_2$. Step 840 may include at least one of steps 742, 744, and 746, each of which are introduced in method 700.

Step 811 is analogous to step 711 of method 700, where the $M_1$ ONUs are those of step 820. Step 812 is analogous to step 712 of method 700, where the $M_2$ ONUs are those of step 840. Step 850 is analogous to step 750 of method 700, where step 840 is repeated during an additional allocation cycle that follows the second time-slot allocation cycle.

Combinations of Features

Features described above as well as those claimed below may be combined in various ways without departing from the scope hereof. The following enumerated examples illustrate some possible, non-limiting combinations.

(A1) denotes a method for allocating bandwidth to a first ONU, a second ONU, $M_1$ ONUs of a plurality of N ONUs of an optical network, and $M_2$ ONUs of the plurality of N ONUs. The first ONU and the second ONU are also part of the optical network. Method (A1) includes, during a first time-slot allocation cycle, (i) granting a respective upstream time slot of a first plurality of upstream time slots to, of the plurality of N ONUs, only each of the $M_1$ ONUs, and (ii) granting a first upstream time slot to the first ONU. Method (A1) also includes during a second time-slot allocation cycle that follows the first time-slot allocation cycle, (i) granting a respective upstream time slot of a second plurality of upstream time slots to, of the plurality of N ONUs, only each of the $M_2$ ONUs, the plurality of NONUs including a skipped-ONU that is one of either, and not both, the $M_1$ ONUs and the $M_2$ ONUs; and (ii) granting a second upstream time slot to a second ONU, which is not one of the plurality of N ONUs. The first ONU, the second ONU, and each of the plurality of N ONUs may be communicatively coupled to an optical line terminal (OLT) of the optical network.

(B1) A bandwidth allocation method includes, during a first time-slot allocation cycle, granting a respective upstream time slot of a first plurality of upstream time slots to $M_1$ ONUs, and to no other ONUs, of a plurality of N ONUs. The method also includes, during the first time-slot allocation cycle, granting a first upstream time slot to a first ONU, which is not one of the plurality of N ONUs. The method also includes, during a second time-slot allocation cycle that follows the first time-slot allocation cycle, granting a respective upstream time slot of a second plurality of upstream time slots to $M_2$ ONUs, and to no other ONUs, of the plurality of N ONUs. Each of $M_1$ and $M_2$ is a positive integer less than N. The plurality of N ONUs includes a skipped-ONU that is one of either, and not both, the $M_1$ ONUs and the $M_2$ ONUs. The method also includes, during the second time-slot allocation cycle, granting a second upstream time slot to a second ONU, which is not one of the plurality of N ONUs. The first ONU, the second ONU, and each of the plurality of N ONUs may be communicatively coupled to an optical line terminal (OLT) of an optical network.

(B2) In embodiments of either one of method (A1) and (B1), the first ONU and the second ONU are the same ONU.

(B3) Embodiments of any one of methods (A1), (B1), and (B2) include at least one of, during the first time-slot allocation cycle, abstaining from granting any time slot of the first time-slot allocation cycle to the second ONU; and, during the second time-slot allocation cycle, abstaining from granting any time slot of the second time-slot allocation cycle to the first ONU.

(B4) Embodiments of any one of methods (A1) and (B1)-(B3) further include at least one of, during the first time-slot allocation cycle, abstaining from granting a time slot to each of (N–$M_1$) ONUs of the plurality of N ONUs not granted an upstream time slot of the first plurality of upstream time slots; and, during the second time-slot allocation cycle, abstaining from granting a time slot to each of (N–$M_2$) ONUs of the plurality of N ONUs not granted an upstream time slot of the second plurality of upstream time slot.

(B5) In embodiments of any one of methods (A1) and (B1)-(B4), each of the first ONU and the second ONU is one of a plurality of Q ONUs, each of which is communicatively coupled to the OLT. The first and second time-slot allocation cycles include a first and a second plurality of additional upstream time slots respectively. Such embodiments may further include when granting the first upstream time slot, granting a respective additional upstream time slot, of the first plurality of additional upstream time slots, to ($P_1-1$) ONUs, and to no other ONUs, of the plurality of Q ONUs, Q exceeding $P_1$ and $P_1$ being a positive integer. Such embodiments may also include, when granting the second upstream time slot, granting a respective additional upstream time slot, of the second plurality of additional upstream time slots to ($P_2-1$) ONUs, and to no other ONUs, of the plurality of Q ONUs, Q exceeding $P_2$ and $P_2$ being a positive integer.

(B6) In embodiments of method (B5), the ($P_1-1$) ONUs include the second ONU, and the ($P_2-1$) ONUs include the first ONU.

(B7) Embodiments of any one of methods (A1) and (B1)-(B6), further include at least one of, after the first time-slot allocation cycle and before the second time-slot allocation cycle, (i) transmitting data from the first ONU to the OLT, and (ii) transmitting data from each of the $M_1$ ONUs to the OLT. Such embodiments also include, after the second time-slot allocation cycle, (i) transmitting data from the first ONU to the OLT, and (ii) transmitting data from each of the $M_2$ ONUs to the OLT.

(B8) Embodiments of method (B7) include at least one of, when transmitting data from each of the $M_1$ ONUs, transmitting, by each of the $M_1$ ONUs, a respective guard interval to the OLT such that, during the first time-slot allocation cycle, a total number of guard intervals associated with data transmitted by the plurality of N ONUs is less than N. Such embodiments also include, when transmitting data from each of the $M_2$ ONUs, transmitting, by each of the $M_2$ ONUs, a respective guard interval to the OLT such that, during the second time-slot allocation cycle, that a total number of guard intervals associated with data transmitted by the plurality of N ONUs is less than N.

(B9) Embodiments of any one of methods (A1) and (B1)-(B8) further include at least one of, before granting the respective upstream time slot, selecting the $M_1$ ONUs according to at least one of (a) a queue depth, (b) traffic type, (c) a quality of service agreement, and (d) latency requirement, of each of the plurality of N ONUs. Such embodiments also include, before granting the respective upstream time slot, selecting the $M_2$ ONUs of the plurality of N ONUs according to at least one of (a) queue depth, (b) traffic type, (c) quality of service agreement, and (d) latency requirement of each of the plurality of N ONUs.

(B10) Embodiments of any one of methods (A1) and (B1)-(B9) further include at least one of (i) before granting the respective upstream time slot, selecting the $M_1$ ONUs probabilistically; and (ii) before granting the respective upstream time slot, selecting the $M_2$ ONUs probabilistically.

(B11) In embodiments of any one of methods (A1) and (B1)-(B10), the plurality of N ONUs including a twice-skipped-ONU that is among neither of the $M_1$ ONUs and the $M_2$ ONUs. Such embodiments may further include, during an additional time-slot allocation cycle that follows the second time-slot allocation cycle: granting a respective upstream time slot of an additional plurality of upstream time slots to $M_3$ ONUs, and to no other ONUs, of the plurality of N ONUs. $M_3$ is a positive integer less than N, and the $M_3$ ONUs include the twice-skipped-ONU.

(B12) In embodiments of any one of methods (A1) and (B1)-(B11), at least one of $M_1=1$ and $M_2=1$.

(C1) An optical line terminal includes a processor and a memory communicatively coupled thereto. The memory storing non-transitory computer-readable instructions that, when executed by the processor, cause the processor to execute any one of methods (A1) and (B1) through (B12).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for allocating bandwidth between a plurality of devices of a network, the method comprising:
    during a first timeslot allocation cycle, granting a respective first upstream time slot of a plurality of first upstream timeslots to a first set of the devices;
    during a second time-slot allocation cycle that follows, and is consecutive to, the first time-slot allocation cycle, granting a respective second upstream time-slot of a plurality of second upstream timeslots to a second set of the devices;
    wherein:
        the plurality of devices includes a skipped device;
        only one of the first set or the second set includes the skipped device.

2. The method of claim 1, further comprising, during the first timeslot allocation cycle, granting a timeslot of the plurality of first upstream timeslots to a first device.

3. The method of claim 2, further comprising, during the second timeslot allocation cycle, granting a timeslot of the plurality of second upstream timeslots to the first device.

4. The method of claim 2, further comprising, during the second timeslot allocation cycle, granting a timeslot of the plurality of second upstream timeslots to a second device of the plurality of devices different from the first device.

5. The method of claim 2, the first device being associated with a first virtual device group, the first set of devices and the second set of devices being associated with at least one additional virtual device group.

6. The method of claim 1, the devices being optical network units (ONUs).

7. The method of claim 1, each of the plurality of devices being communicatively coupled to an optical line terminal (OLT) of the network.

8. The method of claim 1, wherein a quantity of devices is more than a quantity of the plurality of first upstream timeslots and a quantity of the second upstream timeslots.

9. The method of claim 1, the network being an optical network.

10. The method of claim 1, the network being a point to multi-point network.

11. A device for allocating bandwidth in a network, comprising:
    a processor; and
    a memory storing non-transitory computer-readable instructions that, when executed by the processor, cause the processor to:
        during a first timeslot allocation cycle, grant a respective first upstream time slot of a plurality of first upstream timeslots to a first set of a plurality of devices of the network, during a second time-slot allocation cycle that follows, and is consecutive to, the first time-slot allocation cycle, grant a respective second upstream time-slot of a plurality of second upstream timeslots to a second set of the plurality of devices of the network;

wherein:
the plurality of devices includes a skipped device;
only one of the first set or the second set includes the skipped device.

12. The device of claim 11, the computer-readable instructions including further non-transitory computer instructions that, when executed by the processor, further causing the processor to: during the first timeslot allocation cycle, granting a timeslot of the plurality of first upstream timeslots to a first device of the plurality of devices.

13. The device of claim 12, the computer-readable instructions including additional non-transitory computer instructions that, when executed by the processor, further cause the processor to: during the second timeslot allocation cycle, grant a timeslot of the plurality of second upstream timeslots to the first device of the plurality of devices.

14. The device of claim 12, the computer-readable instructions including additional non-transitory computer instructions that, when executed by the processor, further cause the processor to: during the second timeslot allocation cycle, granting a timeslot of the plurality of second upstream timeslots to a second device of the plurality of devices different from the first device.

15. The device of claim 12, the first device being associated with a first virtual device group, the first set of devices and the second set of devices being associated with at least one additional virtual device group.

16. The device of claim 11, the devices being optical network units (ONUs).

17. The device of claim 11, each of the ONUs plurality of devices being communicatively coupled to an optical line terminal (OLT) of the network.

18. The device of claim 11, wherein a quantity of devices is more than a quantity of the plurality of first upstream timeslots and a quantity of the second upstream timeslots.

19. A method for allocating bandwidth between a plurality of devices of a network, the method comprising:
during a first timeslot allocation cycle, granting a respective first upstream time slot of a plurality of first upstream timeslots to a first set of the devices;
during a second time-slot allocation cycle that follows the first time-slot allocation cycle, (i) granting a respective second upstream time-slot of a plurality of second upstream timeslots to a second set of the devices, and (ii) granting a timeslot of the plurality of second upstream timeslots to a second device of the plurality of devices different from the first device;
wherein:
the plurality of devices includes a skipped device;
only one of the first set or the second set includes the skipped device.

20. A device for allocating bandwidth in a network, comprising:
a processor; and
a memory storing non-transitory computer-readable instructions that, when executed by the processor, cause the processor to:
during a first timeslot allocation cycle, grant a respective first upstream time slot of a plurality of first upstream timeslots to a first set of a plurality of devices of the network,
during a second time-slot allocation cycle that follows the first time-slot allocation cycle, (i) grant a respective second upstream time-slot of a plurality of second upstream timeslots to a second set of the plurality of devices of the network, and (ii) grant a timeslot of the plurality of second upstream timeslots to a second device of the plurality of devices different from the first device;
wherein:
the plurality of devices includes a skipped device;
only one of the first set or the second set includes the skipped device.

* * * * *